J. R. PEIRCE.
STONE SAW.
APPLICATION FILED AUG. 4, 1908.

962,663

Patented June 28, 1910.

WITNESSES:
Fred White
René Bruine

INVENTOR:
John Royden Peirce,
By Attorneys
Arthur E. Frasert Unna

UNITED STATES PATENT OFFICE.

JOHN ROYDEN PEIRCE, OF NEW YORK, N. Y., ASSIGNOR TO ROYDEN MARBLE MACHINERY COMPANY, OF NEW YORK, N. Y., A CORPORATION OF NEW JERSEY.

STONE-SAW.

962,663.  Specification of Letters Patent.  Patented June 28, 1910.

Application filed August 4, 1908. Serial No. 446,948.

*To all whom it may concern:*

Be it known that I, JOHN ROYDEN PEIRCE, a citizen of the United States, residing in the borough of Manhattan, city, county, and State of New York, have invented certain new and useful Improvements in Stone-Saws, of which the following is a specification.

The present invention aims to provide a stone saw especially useful for marble or similar stone and using separate removable and replaceable teeth of particular construction and which effect an economy of time, efficiency and durability.

The accompanying drawings illustrate an embodiment of the invention.

Figure 2:
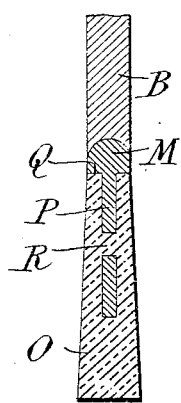
Figure 1:
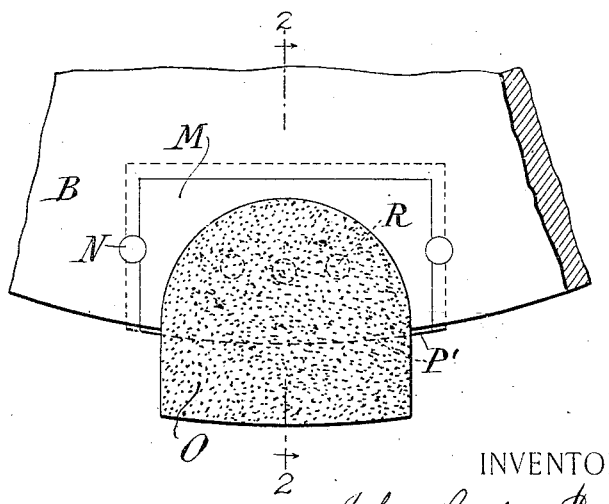

Figure 1 is a face elevation of a portion of the periphery of a saw or wheel embodying the invention; it being understood that, although the drawing shows only a portion of the saw including a single tooth, the complete saw consists merely in a repetition of the portion shown. Fig. 2 is a section on the line 2—2.

The saw may be of any known or suitable type, such as a circular saw or a reciprocating saw, or it may be of cylindrical shape with the teeth at one edge for counterboring or countersinking. The teeth may be (by way of example) approximately the same size as the steel teeth, each containing four diamonds, heretofore used; that is to say, about 2¼ inches in the longitudinal or peripheral direction, and 1½ inches or more in the transverse or radial direction. In thickness they may be about a quarter of an inch, so as to project sidewise and edgewise beyond the usually one-eighth inch blade and to cut in the manner of the solid steel teeth of wood saws. The outer edges of the teeth project beyond the edge of the blade as far as is consistent with the strength of the teeth, and renewals will not be found necessary until this outwardly projecting portion is substantially worn away. The blade is provided with sockets at suitable intervals, preferably as close together as possible having regard for the necessary strength. The term "longitudinal" is used in the sense of parallel with the direction of the cut; the term "transverse" referring to the direction crossing the longitudinal one, and in the plane of the blade. Similarly the "length" of each tooth is its distance in the longitudinal direction, its "width" the distance in a transverse direction in the plane of the blade, and its "thickness" its distance in the direction at right angles to the plane of the blade.

Referring now to the embodiment of the invention illustrated the removable and replaceable tooth is made with a steel back M which fits into a correspondingly shaped socket in the edge plate or blade B of the saw, the back M having rounded or otherwise projecting edges, as indicated in Fig. 2, lying in corresponding grooves in the edges of the socket, and being rigidly held in place by rivets N. This is a common type of fastening, and any other known style suitable may be used. A reduced web P is formed at the central part of the outer portion of said back M and nearly equal in length and width to said back and so as to form shoulders upon opposite faces (Fig. 2) and extending along the forward and rearward transverse edges of the web and along its inner longitudinal edge. The outer longitudinal edge P' of the web coincides substantially with that of the back and with that of the blade B. A portion O of carborundum or other suitable agglomerated crystalline or granular material is cast or molded upon the web covering both faces thereof and extending to said shoulders Q and extending also beyond the outer edge of the web.

The web P may be provided with openings R, or may be roughened or otherwise constructed to secure a firm grip of the carborundum. Ordinarily, however, such special precautions are unnecessary, as the carborundum can be molded with a close engagement upon the face of the web P. Various other means for attaching the carborundum to the steel back M of the tooth may be provided, some of which are illustrated for example in my Patent No. 894,046 of July 21, 1908.

The carborundum is flared toward its outer edge, the thickness thereof being at least as great as that of the metal at all points.

The tapering of the faces of the tooth not only facilitates molding it, but improves the quality of the work as I have found by experiment. With the flared tooth the edge of the cut on the marble is sharper and cleaner than with any other shape.

It will be understood that the dimensions and proportions of the parts may vary. For practical uses the following principal dimensions will be satisfactory:—length of teeth at cutting edge, 1⅜ inches. Width of teeth, from 1¼ to 1⅜ inches. Thickness of teeth, from 5/16 to ¼ inch. Thickness of blade 3/16 inch. Longitudinal distance between successive teeth at their outer edges, 1⅜ inches,—that is to say, the teeth are approximately the same size and spacing as the steel teeth each containing four diamonds heretofore used in similar classes of work. Preferably the teeth will be made as long as possible, so as to reduce the number of parts and to reduce the amount of time and labor involved in renewing the teeth of any wheel. The angles may be substantially as indicated on the drawings. An elastic bond for the carborundum is preferred with this type of wheel. A good bond for this class of work is effected by mixing in the following proportions carborundum 86 per cent., rubber 10½ per cent., and sulfur 3½ per cent. The carborundum, rubber and sulfur are heated and pressed in a mold about the web P and vulcanized in the ordinary way. For other bonds the usual methods of manufacture will be suitable.

The shape of the carborundum portion O and the metal back M and especially of the engaging portions of this carborundum and metal, may be variously modified.

A saw constructed in accordance with this invention has numerous advantages. The elastic nature of the bond allows a slight yielding when the wheel strikes one of the frequent irregular hard spots which are found in most marbles; while the reinforcement provided by the metal web prevents so great a yield as might break the carborundum or might result in a cut too much out of a straight line to be acceptable. This web may be made extremely thin because of the support which it has at its two ends and its inner edge and because of its comparatively short length, and especially because it does not take all the strain exerted in pushing the tooth through the work. A large part, perhaps the greater part, of this strain is in the longitudinal directions and is transmitted from the carborundum to the shoulders Q at one or the other end of the tooth, according to the direction of rotation of the saw. This is especially true of an elastic bond. The support provided for the carborundum by the web and shoulders is carried to the edge of the blade, providing an abundant support for the integral portion of carborundum which extends beyond the edge and at the same time leaving this extending portion free so that it may wear down practically to the edge of the blade.

In previous applications, Nos. 500,250 and 527,081 filed respectively June 5th and November 9th, 1909, I have described and claimed broadly the type of saw and the method of using it, the present application being restricted to the particular combinations covered by the following claims.

What I claim is:

1. A saw having a blade provided with sockets along its edge and separate removable and replaceable teeth in said sockets, each of said separate teeth comprising a metal back rigidly fastened in a socket in the blade, a reduced web at the central part at the outer portion of said back and forming shoulders extending along its forward and rearward transverse edges and its inner longitudinal edge, the outer longitudinal edge of said web coinciding substantially with that of the back and with that of the blade, and a portion of carborundum molded upon both faces of said web and extending to said shoulders in a longitudinal and transverse direction and extending also beyond the outer edge of said web, the carborundum being molded with an elastic bond and being stiffened against lateral deflection by the embedded web and being supported against longitudinal and transverse strains by its transverse and longitudinal engagement with said shoulders.

2. A stone saw having a blade B provided with sockets along its edge and separate removable and replaceable teeth in said sockets each of said separate teeth comprising a metal back M fitting into a socket in the blade and rigidly fastened therein, a reduced web P at the central part of the outer portion of said back M and forming shoulders Q extending along its forward and rearward transverse edges and its inner longitudinal edge, the outer longitudinal edge of said web coinciding substantially with that of the back and with that of the blade, and a portion O of carborundum molded upon both faces of said web and extending to said shoulders Q in the longitudinal and transverse directions and extending also beyond the outer edge of said web P, the carborundum being molded with an elastic bond and being stiffened against lateral deflection by the embedded web and being supported against longitudinal and transverse strains by its transverse and longitudinal engagement with said shoulders.

In witness whereof, I have hereunto signed my name in the presence of two subscribing witnesses.

JOHN ROYDEN PEIRCE.

Witnesses:
 DOMINGO A. USINA,
 THEODORE T. SNELL.